(12) United States Patent
Gramegna et al.

(10) Patent No.: US 8,629,715 B1
(45) Date of Patent: Jan. 14, 2014

(54) CLOCK DISTRIBUTION SCHEME

(75) Inventors: Giuseppe Gramegna, Golfe Juan (FR);
Pasquale Lamanna, Cannes (FR);
Maxime Vignasse, Villeneuve-Loubet (FR)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 13/596,449

(22) Filed: Aug. 28, 2012

(51) Int. Cl.
*H03B 1/00* (2006.01)
(52) U.S. Cl.
USPC .............................. 327/551; 333/12
(58) Field of Classification Search
USPC ............ 327/565, 551, 293; 333/156, 157, 26, 333/25, 27, 236, 238, 239, 241, 242, 246, 333/248, 260, 136, 137, 12
See application file for complete search history.

(56) References Cited

U.S. PATENT DOCUMENTS

| 7,596,195 B2 * | 9/2009 | Pan ............................... 375/350 |
| 2009/0073297 A1 | 3/2009 | Cho et al. |
| 2011/0063048 A1 * | 3/2011 | Floyd et al. ................... 333/136 |

* cited by examiner

*Primary Examiner* — Lincoln Donovan
*Assistant Examiner* — Jung H Kim
(74) *Attorney, Agent, or Firm* — RatnerPrestis

(57) ABSTRACT

An apparatus for propagating local oscillator signals in a circuit, the apparatus comprising two pairs of lines carrying respectively differential in-phase and quadrature signals. The lines are arranged such that in at least one region along their length one of each pair of lines crosses the other of the pair to create a twist. The twist(s) in each respective pair of lines is offset from the twist(s) in the other pair of lines such that the portion of their length over which the in-phase lines magnetically couple to the quadrature lines with a positive coupling coefficient is substantially equal to the portion of their length over which the in-phase lines magnetically couple to the quadrature lines with a negative coupling coefficient.

13 Claims, 2 Drawing Sheets

CLOCK DISTRIBUTION SCHEME

FIELD OF THE INVENTION

The present invention relates to propagation of local oscillator signals. More specifically, an aspect of the invention relates to inputting in-phase and quadrature local oscillator signals from a phase locked loop into receive and/or transmit sections of a radio receiver/transmitter/transceiver for transmit chain up-conversion or receive chain down-conversion of radio signals.

BACKGROUND

A simple method of propagating an electrical signal is to use a single-ended line. However, single-ended lines tend to be vulnerable to noise effects. This can be a particular problem in low-voltage circuits, especially in a crowded and compact electrical environment such as a mobile phone or other portable radio device. In such devices a great deal of functionality is required in as small a volume as possible which can lead to problems with electromagnetic compatibility.

Differential lines may be used instead of single-ended lines. Signals transmitted on single-ended lines are simply referenced to ground with any noise picked up during transmission superimposed on them. Differential lines are pairs of lines with one carrying a positive version of the signal and the other a negative version. Their outputs are then subtracted from one another so that noise effects affecting both lines are cancelled out and the overall signal to noise ratio, even for noise only affecting one of the two lines, is reduced.

Although differential lines are generally an improvement over single-ended lines, some problems remain. Large voltage swings can occur on long lines, resulting in electrical perturbation and power loss. In addition, due to the spatial separation between the two lines, some noise sources (e.g. magnetic aggression and parasitic electrical effects) are likely to affect one line to a greater degree than the other. Asymmetrical effects like this are not cancelled when the differential signals are subtracted.

The latter of the problems mentioned above impedes the use of differential lines for propagation of in-phase and quadrature signals. These are two versions of the same local oscillator signal, with a phase difference of ninety degrees. Such signals are commonly used in the coding and modulation/demodulation and decoding of radio messages in the technique known as quadrature amplitude modulation. To be useful for these purposes the integrity of the ninety degree phase relationship of the in-phase and quadrature signals must be maintained. However, in transceiver chip implementations (which must be as small as possible) the in-phase and quadrature signals generally need to be transmitted with little spatial separation. If differential lines are used in this case, then the parasitic capacitance and inductance generated between lines has a greater effect on adjacent lines than non-adjacent lines, leading to degradation in the phase relationship.

The conventional method for propagating local oscillator signals from a phase locked loop to a transmit or receive chain on-chip is to transfer the local oscillator signals as differential voltage signals, typically rail-to-rail signals. This generates electrical perturbation on the silicon substrate and surrounding circuits. Moreover, in such an arrangement, buffers used to transfer the signal generated by the local oscillator to a power amplifier need to have a very high reverse isolation to avoid the quality of the local oscillator being corrupted due to the signal present on the transmitter mixer. (The transmitter mixer uses the local oscillator signals and a base-band signal to generate the radio frequency signals for application to the power amplifier and antenna.) This is called local oscillator pulling.

What is needed is an apparatus for propagating local oscillator in-phase and quadrature signals with high reverse and external isolation, high common mode rejection, and electrical and electromagnetic perturbation as low as possible.

SUMMARY

According to the present invention, there is provided a circuit configured to propagate local oscillator signals from a local oscillator to a communication unit, the circuit comprising: a first pair of lines connected to receive differential in-phase signals generated by the local oscillator and output those signals to the communication unit; and a second pair of lines connected to receive differential quadrature signals generated by the local oscillator and output those signals to the communication unit; said lines being arranged such that: a first line of the first pair is, in use, magnetically coupled to a first line of the second pair for a first portion of its length with a coupling coefficient K, and magnetically coupled to a second line of the second pair for a second portion of its length with a coupling coefficient −K; and a second line of the first pair is magnetically coupled to the second line of the second pair for a third portion of its length with coupling coefficient K, and magnetically coupled to the first line of the second pair for a fourth portion of its length with coupling coefficient −K; the sum of the first and third portions being substantially equal to the sum of the second and fourth portions.

At least once along their length, one of the first pair of lines may cross the other to create a twist. At least once along their length, one of the second pair of lines may cross the other to create a twist.

The first portion may be equal to the third portion.

Each pair of lines may be connected to receive the differential signals in current-mode.

The circuit may be formed in an integrated circuit chip. Such a chip may be a CMOS integrated circuit chip. The lines may be formed in metallic layers of the chip. The twists may be located in a first layer of the chip and substantially all of the remaining length of each line may be located in a second layer of the chip, which is different from the first layer. The first layer and the second layer may have substantially the same resistivity.

Each pair of lines may be connected to the outputs of a buffer configured to convert the differential signals in voltage-mode into the differential signals in current-mode for transmission by the lines. Each pair of lines may be connected to the inputs of a buffer configured to convert the current-mode differential signals output by the lines into voltage-mode output signals.

The circuit may be a circuit for transmitting or receiving radio signals. Said local oscillator signals may be propagated for down-conversion of a received radio signal or up-conversion of a radio signal to be transmitted.

BRIEF DESCRIPTION OF THE DRAWINGS

Aspects of the present invention will now be described by way of example with reference to the accompanying figures. In the figures.

DETAILED DESCRIPTION

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

An apparatus for propagating local oscillator signals in a circuit will now be described. This apparatus comprises two pairs of lines carrying respectively differential in-phase and quadrature signals. Those lines are arranged such that in at least one region along their length one of each pair of lines crosses the other of the pair to create a twist. The twist(s) in each respective pair of lines is offset from the twist(s) in the other pair of lines such that the portion of their length over which the in-phase lines couple to the quadrature lines with a positive coupling coefficient is substantially equal to the portion of their length over which the in-phase lines couple to the quadrature lines with a negative coupling coefficient.

Figure 1A:
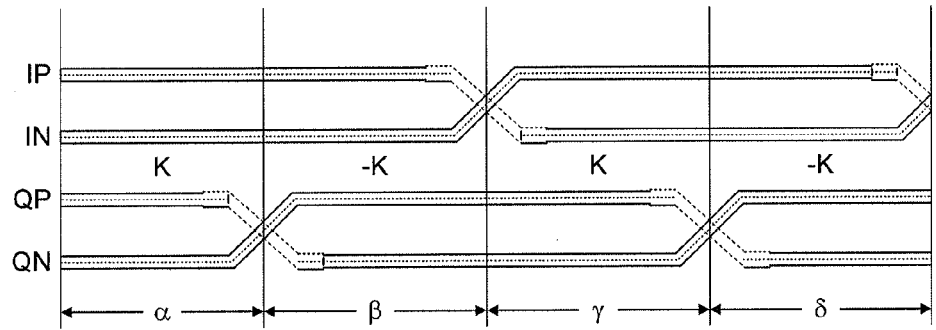
FIGS. 1A and 1B show arrangements of twisted differential in-phase and quadrature lines.

Examples of such an apparatus are shown schematically in FIG. 1. FIG. 1a illustrates a pair of differential lines adjacent to another pair of differential lines. One pair (QP, QN) carries a quadrature signal and the other pair (IP, IN) carries an in-phase signal. If all of the lines were to be straight and parallel then adjacent lines would generate non-zero parasitic inductances and capacitances. However, in the arrangement shown in FIG. 1a the couplings are as follows. In the first section, IN couples to QP with coupling coefficient Kin_qp and in the second section IN couples to QN with coupling coefficient Kin_qn. Since QP and QN are carrying differential signals, Kin_qn=−Kin_qp so, provided the first and second sections are of substantially equal length, overall these couplings have no effect. An analogous situation arises between IP and the two Q lines in the third and fourth sections since Kip_qn=−Kip_qp. Similarly, Kin_qn=−Kip_qn and Kin_qp=−Kip_qp. Defining K by K=Kin_qp, the coupling coefficients in sections α to δ in order are thus: K, −K, K, −K as shown. The symmetry in the electromagnetic disturbances between the I and Q channels due to the twists in the lines means that there is no net degradation of IQ precision.

FIG. 1a shows one full twist in the I channel pair and two full twists in the Q channel pair such that: the IN line is adjacent to the QP line for one continuous portion of length α, the IN line is adjacent to the QN line for one continuous portion of length β, the IP line is adjacent to the QN line for one continuous portion of length γ and the IP line is adjacent to the QP line for one continuous portion of length δ; and α=β=γ=δ. However the invention is not limited to such an arrangement. For example, α does not necessarily have to equal γ and β does not necessarily have to equal δ, provided α+γ=β+δ.

The arrangement of FIG. 1a could be repeated any number of times so that the total portion of length for which each line is adjacent to each other line is composed of multiple smaller continuous portions. Such repeats would not necessarily have to be of the same length. Any arrangement imaginable (and allowed by other practical constraints of the particular implementation) may be used provided that each line is adjacent to each of the lines of the other pair for a substantially equal total portion of its length.

Figure 1B:
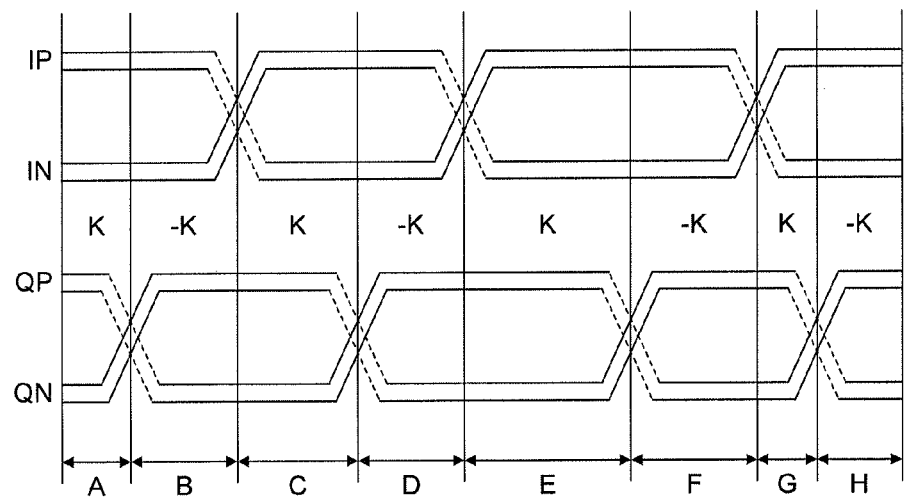

In the arrangement shown in FIG. 1b, lengths A to H can take any value provided two conditions are met. Firstly, practical requirements must be met. That is, A+B+C+D+E+F+G+H must be equal to the length of a path between the input to the arrangement (e.g. a buffer output of a local oscillator) and the output from the arrangement (e.g. a buffer output of a receive or transmit chain). In the case of an integrated circuit implementation that path must be within the boundaries of the chip. The path should preferably be substantially straight as shown but curves, for example around other components, could be included provided the design is such that electromagnetic compatibility is maintained to an acceptable level. Secondly, the total length over which the quadrature and in-phase lines are coupled by a positive coupling coefficient (K) must be substantially equal to the total length over which the quadrature and in-phase lines are coupled by a negative coupling coefficient (−K), i.e. A+C+E+G=B+D+F+H. This ensures that all the couplings between the pairs cancel one another.

Figure 2:
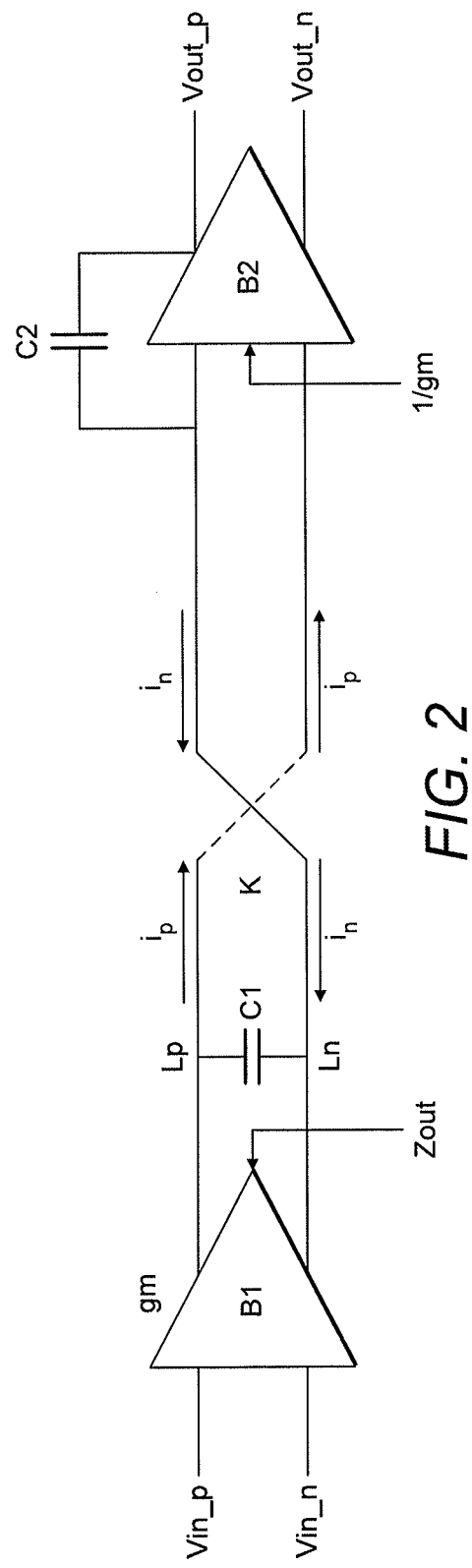
FIG. 2 shows a schematic diagram of apparatus for propagating a local oscillator signal.

FIG. 2 shows the I channel differential lines in more detail. FIG. 2 incorporates further components which are not necessarily required, but provides an example of how the apparatus may be implemented in an integrated circuit (IC). For example it may be used for propagating a local oscillator signal from a phase locked loop to a radio transmit or receive chain in a radio transmitter, receiver or transceiver. Such a local oscillator signal could be input to a mixer for down-conversion or up-conversion of a radio signal.

Vin_p and Vin_n are differential voltage-mode local oscillator signals input to buffer B1. B1 has a current conversion gain of gm and high impedance Zout. Buffer B1 converts the inputs into current-mode for transmission. This is more efficient than transmission in voltage-mode, and means that very little voltage swing is generated along the line that can perturb the substrate of the IC, which would disturb surrounding circuitry such as the local oscillator. Buffer B1 produces differential current-mode signals $$i_p = gm * Vin\_p \quad \text{(equation 1)}$$

and $$i_n = gm * Vin\_n. \quad \text{(equation 2)}$$

These signals are propagated along two twisted lines magnetically coupled with equivalent (self and mutual) inductances of Lp and Ln respectively and coupling factor k. Current-mode signals $i_p$ and $i_n$ are then converted back to voltage-mode by block B2 which has a gain of 1/gm. This produces differential signals $$Vout\_p = (1/gm) * i_p = Vin\_p = Vp \quad \text{(equation 3)}$$

and $$Vout\_n = (1/gm) * i_n = Vin\_n = Vn. \quad \text{(equation 4)}$$

It can be seen that $$Vp = L11 * i_p + M12 * i_n \quad \text{(equation 5)}$$

and $$Vn = M21 * i_p + L22 * i_n \quad \text{(equation 6)}$$

where L11 and L22 are self inductances of the respective lines and M12 and M21 are their mutual inductances. Preferably the lines are symmetrical; that is they are made of the same material, have substantially the same dimensions, run parallel to one another in the regions in which they are not crossing one another, and the crossing points are located substantially halfway between the imaginary parallel straight lines along which the lines are directed in the regions in which they are not crossing one another. In this case, $$M12=M21=M \quad \text{(equation 7)}$$

and $$L11=L22=L. \quad \text{(equation 8)}$$

For differential signals, $$i_p=-i_n \quad \text{(equation 9)}$$

giving $$Lp=Ln=L-M. \quad \text{(equation 10)}$$

For common mode signals, $$i_p=i_n \quad \text{(equation 11)}$$

giving $$Lp=Ln=L+M. \quad \text{(equation 12)}$$

The common mode rejection ratio is therefore:

$$CMR=(L-M)/(L+M). \quad \text{(equation 13)}$$

The coupling factor k is:

$$k=\sqrt{[M12*M21]/(L11*L22)}=M/L. \quad \text{(equation 14)}$$

Therefore if k=0.9, CMR=0.1/0.9 giving a 26 dB common-mode rejection. It can be seen from equation 13 that the common mode rejection is lowered significantly due to the mutual inductance between the differential lines.

The output of buffer B2 may be input to a radio transmit or receive chain, most likely comprising a power amplifier. The large signal from the power amplifier introduces a noise signal Vnoise_out2 at the output of the buffer B2. This signal will be transferred at the input of the buffer B2 due to the finite reverse isolation SB2 of buffer B2. Assuming that SB2 is due to parasitic capacitance C2, and that the output impedance of buffer B1 is limited by its output capacitance C1, then the signal transferred to the output of buffer A will be $$[1/sC1]/[1/sC1+(L+M)2\pi fo+1/(sC2]*V\text{noise\_out2}$$

where fo is the operating frequency and s is the Laplace transform j2πf (f=frequency). The total signal present at the input of buffer 131 (that can pull the phase locked loop) will then be $$V\text{noise\_in1}=[1/sC1]/[1/sC1+(L+M)2\pi fo+1/(sC2] \\ *V\text{noise\_out2}*SB1$$

where SB1 is the reverse isolation of buffer B1. Again, the mutual inductance between the differential lines is useful; as L+M appears in the denominator, M lowers the noise present at the input, i.e. the reverse isolation is improved.

The twist in the lines means that both lines experience substantially the same electromagnetic aggression and perturbation. In addition, the current-mode transmission prevents voltage swings from developing across the lines. Therefore capacitances are not charged or discharged for high frequency signals. The effective inductance of the lines could be around 300 pH in the case of differential lines magnetically coupled, instead of 3 nH in the case where the lines are too far apart to have a mutual inductance. Thus there is reduced power consumption.

Such twisted differential lines as have been described may be implemented in metallic layers of a semiconductor chip, for example the M6 and AP layers of a CMOS integrated circuit. The substantially straight and parallel portions of the lines may be in one layer while the twists occur in another, reducing the capacitance towards the substrate. The layers may be adjacent or there may be appropriate vias between them. The layers may suitably have substantially the same resistivity for matching purposes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A circuit configured to propagate local oscillator signals from a local oscillator to a communication unit, the circuit comprising:
    a first pair of lines connected to receive differential in-phase signals generated by the local oscillator and output those signals to the communication unit; and
    a second pair of lines connected to receive differential quadrature signals generated by the local oscillator and output those signals to the communication unit;
    said lines being arranged such that at least once along a length of the first pair of lines, one of the first pair of lines crosses the other one of the first pair of lines to create a first twist, at least once along a length of the second pair of lines, one of the second pair of lines crosses the other one of the second pair of lines to create a second twist, and the first twist is offset from the second twist along the length of the first pair of lines such that:
    a first line of the first pair is, in use, magnetically coupled to a first line of the second pair for a first portion of its length with a coupling coefficient K, and magnetically coupled to a second line of the second pair for a second portion of its length with a coupling coefficient −K; and
    a second line of the first pair is magnetically coupled to the second line of the second pair for a third portion of its length with coupling coefficient K, and magnetically coupled to the first line of the second pair for a fourth portion of its length with coupling coefficient −K;
    the sum of the first and third portions being substantially equal to the sum of the second and fourth portions.

2. A circuit as claimed in claim 1, wherein the first portion is equal to the third portion.

3. A circuit as claimed in claim 1, wherein each pair of lines is connected to receive the differential signals in current-mode.

4. A circuit as claimed in claim 1, formed in an integrated circuit chip.

5. A circuit as claimed in claim 4, formed in a CMOS integrated circuit chip.

6. A circuit as claimed in claim 4, wherein the lines are formed in metallic layers of the chip.

7. A circuit as claimed in claim 6 wherein the twists are located in a first layer of the chip and substantially all of the remaining length of each line is located in a second layer of the chip, which is different from the first layer.

8. A circuit as claimed in claim 7, wherein the first layer and the second layer have substantially the same resistivity.

9. A circuit as claimed in claim 1, in which each pair of lines is connected to the outputs of a buffer configured to convert the differential signals in voltage-mode into the differential signals in current-mode for transmission by the lines.

10. A circuit as claimed in claim 1, in which each pair of lines is connected to the inputs of a buffer configured to convert the current-mode differential signals output by the lines into voltage-mode output signals.

11. A circuit as claimed in claim 1, wherein said circuit is a circuit for transmitting or receiving radio signals.

12. A circuit as claimed in claim 11, wherein said local oscillator signals are propagated for down-conversion of a received radio signal or up-conversion of a radio signal to be transmitted.

13. A circuit as claimed in claim 1, wherein at least one of the first pair of lines and the second pair of lines includes at least one additional twist offset from the first and second twists along the length of the lines.

\* \* \* \* \*

UNITED STATES PATENT AND TRADEMARK OFFICE
CERTIFICATE OF CORRECTION

PATENT NO. : 8,629,715 B1  
APPLICATION NO. : 13/596449  
DATED : January 14, 2014  
INVENTOR(S) : Gramegna et al.

Page 1 of 1

It is certified that error appears in the above-identified patent and that said Letters Patent is hereby corrected as shown below:

On the Title Page, Item (74), under "Attorney, Agent, or Firm", in Column 2, Line 1, delete "RatnerPrestis" and insert -- RatnerPrestia --, therefor.

In the Specification

In Column 5, Line 46, delete "$[1/sC1]/[1/sC1+(L+M)2\pi fo+1/(sC2)]$," and insert -- $[1/sC1] / [1/sC1+(L+M)2\pi fo+1/(sC2)]$ --, therefor.

In Column 5, Line 49, delete "buffer 131" and insert -- buffer B1 --, therefor.

In Column 5, Line 52, delete "$[1/sC1]/[1/sC1+(L+M)2\pi fo+1/(sC2)]$, and insert -- $[1/sC1] / [1/sC1+(L+M)2\pi fo+1/(sC2)]$ --, therefor.

In the Claims

In Column 6, Line 40, in Claim 1, delete "lines such" and insert -- lines, such --, therefor.

In Column 6, Line 64, in Claim 7, delete "claim 6" and insert -- claim 6, --, therefor.

Signed and Sealed this  
Twenty-ninth Day of April, 2014

Michelle K. Lee  
*Deputy Director of the United States Patent and Trademark Office*